US010402554B2

(12) United States Patent
Baca et al.

(10) Patent No.: US 10,402,554 B2
(45) Date of Patent: Sep. 3, 2019

(54) TECHNOLOGIES FOR DEPTH-BASED USER AUTHENTICATION

(71) Applicant: Intel Corporation, Santa Clara, CA (US)

(72) Inventors: Jim S. Baca, Corrales, NM (US); David Stanasolovich, Albuquerque, NM (US); Tobias M. Kohlenberg, Portland, OR (US); Prital B. Shah, Chandler, AZ (US); David W. Baker, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,858

(22) Filed: Jun. 27, 2015

(65) Prior Publication Data
US 2016/0378968 A1    Dec. 29, 2016

(51) Int. Cl.
| | |
|---|---|
| *G06F 21/36* | (2013.01) |
| *H04W 12/06* | (2009.01) |
| *H04W 12/08* | (2009.01) |

(52) U.S. Cl.
CPC .......... *G06F 21/36* (2013.01); *H04W 12/06* (2013.01); *H04W 12/08* (2013.01)

(58) Field of Classification Search
CPC ...................................... G06F 21/36
USPC ......................................... 726/19
See application file for complete search history.

(56) References Cited

U.S. PATENT DOCUMENTS

| | | | |
|---|---|---|---|
| 9,147,061 B1* | 9/2015 | McClendon | G06F 21/32 |
| 2009/0165104 A1* | 6/2009 | Danielsen | G06F 21/41 |
| | | | 726/6 |
| 2010/0169958 A1* | 7/2010 | Werner | G06F 21/36 |
| | | | 726/6 |
| 2012/0120271 A1* | 5/2012 | Park | G06K 9/00597 |
| | | | 348/222.1 |
| 2012/0159583 A1 | 6/2012 | Griffin et al. | |
| 2012/0159608 A1 | 6/2012 | Griffin et al. | |

(Continued)

FOREIGN PATENT DOCUMENTS

| | | |
|---|---|---|
| EP | 2254071 | 11/2010 |
| KR | 10-2014-0134821 | 11/2014 |

(Continued)

OTHER PUBLICATIONS

International Search Report for PCT/US16/034336, dated Sep. 13, 2016 (3 pages).

(Continued)

*Primary Examiner* — Teshome Hailu
(74) *Attorney, Agent, or Firm* — Barnes & Thornburg LLP (57) ABSTRACT

Technologies for depth-based user authentication include a mobile computing device to display a login image including a depth channel on a display of the mobile computing device. The mobile computing device determines a selection of a plurality of objects of the login image made by a user of the mobile computing device, generates a user-selected password based on a relative depth of each object of the plurality of objects selected by the user, and permits access to the mobile computing device in response to a determination that the user-selected password matches a device login password.

18 Claims, 8 Drawing Sheets

(56) References Cited

U.S. PATENT DOCUMENTS

| | | | |
|---|---|---|---|
| 2012/0163672 A1* | 6/2012 | McKinnon | G06T 7/0075 |
| | | | 382/106 |
| 2013/0086674 A1* | 4/2013 | Horvitz | G06F 21/32 |
| | | | 726/19 |
| 2013/0147795 A1 | 6/2013 | Kim et al. | |
| 2014/0032906 A1* | 1/2014 | Corella | H04L 63/0869 |
| | | | 713/168 |
| 2014/0123258 A1* | 5/2014 | Guerrero | G06F 3/0488 |
| | | | 726/7 |
| 2014/0181957 A1 | 6/2014 | Nguyen et al. | |
| 2015/0026068 A1* | 1/2015 | Nuzzi | G06F 21/31 |
| | | | 705/44 |

FOREIGN PATENT DOCUMENTS

| | | |
|---|---|---|
| KR | 10-2014-0134821 A | 11/2014 |
| WO | 2014-004093 | 1/2014 |
| WO | 2014004093 A1 | 1/2014 |

OTHER PUBLICATIONS

Written Opinion for PCT/US16/034336, dated Sep. 13, 2016 (6 pages).
International Preliminary Report on Patentability and Written Opinion of the International Searching Authority for Patent Application No. PCT/US2016/034336, dated Jan. 11, 2018, 8 pages.
Extended European search report for European patent application No. 16818412.5, dated Dec. 3, 2018 (8 pages).

* cited by examiner

TECHNOLOGIES FOR DEPTH-BASED USER AUTHENTICATION

BACKGROUND

Smartphones and other mobile computing devices are frequently "locked" after some period of inactivity to prevent an unauthorized user from accessing the contents of the device. Oftentimes, the mobile computing device displays a login image on a touchscreen with which the user may interact to enter a PIN or draw a certain pattern to gain access to the device. Depending on the particular embodiment, various mobile computing devices may be "unlocked" by entering a text-based password, swiping a repeatable pattern, shaking the device in a particular rhythm, tapping the display, using biometrics (e.g., fingerprints, facial recognition, iris recognition, etc.), and/or other suitable authentication techniques. However, many such authentication techniques are computationally intensive, time consuming, inconvenient for users, and/or have security weaknesses. For example, many user-preferred pattern-based authentication mechanisms (e.g., character/digit-based password entry, pattern swiping, etc.) involve the user touching the same portion of a touchscreen repeatedly, which often leaves easily analyzable fingerprint smudges.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
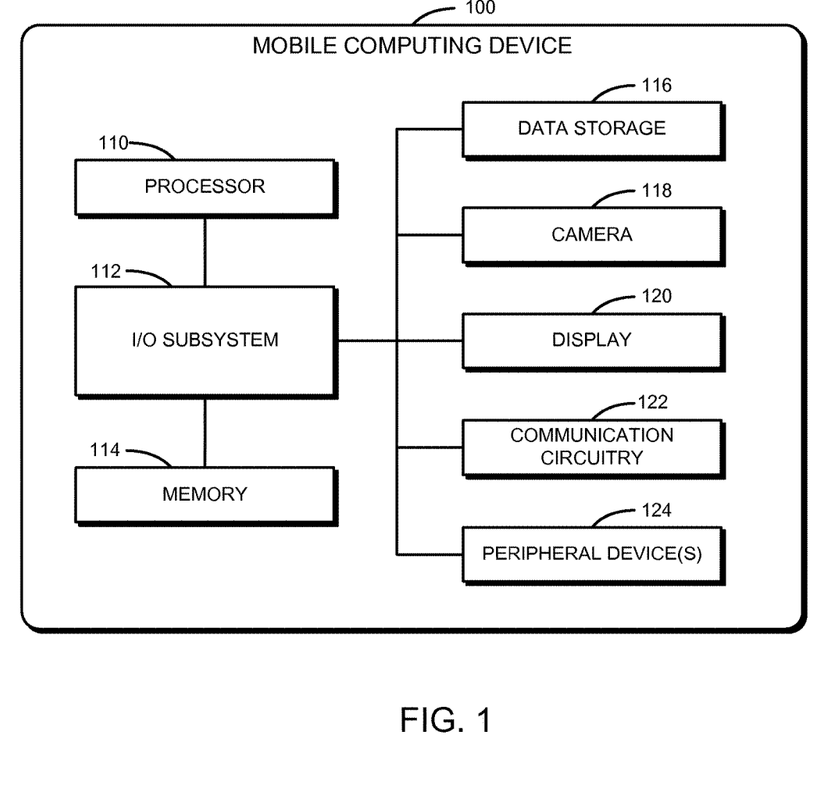
FIG. 1 is a simplified block diagram of at least one embodiment of a mobile computing device for depth-based user authentication.

Referring now to FIG. 1, a mobile computing device 100 for depth-based user authentication is shown. As described in detail below, the mobile computing device 100 may perform user authentication (e.g., to permit device login) based on depth/disparity information associated with a user's selections of objects in a three-dimensional (3D) image displayed on a display 120 of the mobile computing device 100. For example, in some embodiments, a user may select a sequence of objects in a login image at various depths, and the mobile computing device 100 may determine a password based on the depths of the selected objects in the login image. Accordingly, as described below, the user may "enter" the login password by selecting objects at a particular depth sequence (e.g., near-far-middle-near) without having to select the same objects for each entry of the password. As such, it should be appreciated that the techniques described herein eliminate or diminish many of the security vulnerabilities associated with various other pattern-based authentication techniques.

The illustrative mobile computing device 100 may be embodied as any type of computing device capable of performing the functions described herein. For example, the mobile computing device 100 may be embodied as a smartphone, cellular phone, tablet computer, wearable computing device, personal digital assistant, mobile Internet device, laptop computer, notebook, netbook, Ultrabook™, smart device, and/or any other computing/communication device. It should be appreciated that, although being described as a mobile device, the mobile computing device 100 may be embodied as a stationary computing device (e.g., a desktop computer) in other embodiments. As shown in FIG. 1, the illustrative mobile computing device 100 includes a processor 110, an input/output ("I/O") subsystem 112, a memory 114, a data storage 116, a camera 118, the display 120, a communication circuitry 122, and one or more peripheral devices 124. Of course, the mobile computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the mobile computing device 100 as described herein.

The camera 118 may be embodied as any device, component, or collection thereof capable of capturing images and/or video. In the illustrative embodiment, the camera 118 is embodied as a three-dimensional (3D) camera capable of capturing color images including a depth image, channel, or stream. For example, the camera 118 may have an RGBD (red-green-blue-depth) sensor or a similar camera sensor that may capture images having four channels—a depth channel and three color channels (i.e., non-depth channels). Of course, the color values of the image may be represented in another way (e.g., grayscale, HSL, HSV, etc.). Further, in some embodiments, the mobile computing device 100 may include a camera 118 having a sensor configured to capture two-dimensional (2D) images (e.g., color images) and another sensor configured to capture depth. In some embodiments, the camera 118 is embodied as an Intel® RealSense™ camera (e.g., an Intel® RealSense™ model R100 or R200). Further, in some embodiments, each of the images captured by the camera 118 is formatted as a "fat jpg." Of course, in other embodiments, another camera 118 and/or file format suitable for the functions described herein may be used.

It should be appreciated that the camera 118 may determine depth measurements of objects in a scene in a variety of ways depending on the particular camera 118 used. For example, the camera 118 may include an infrared (IR) projector and an IR sensor such that the IR sensor estimates depth values of objects in the scene by analyzing the IR light pattern projected on the scene by the IR projector. In another embodiment, the camera 118 includes at least two lenses and corresponding sensors configured to capture images from at least two different viewpoints of a scene (e.g., a stereo camera). Based on those viewpoints, the mobile computing device 100 may calculate a distance of objects in the captured scene.

The display 120 of the mobile computing device 100 may be embodied as any type of display on which information may be displayed to a user of the mobile computing device 100. In the illustrative embodiment, the display 120 is embodied as a touchscreen display configured to display a login screen for a user of the mobile computing device 100 and capable of receiving tactile user input. The display 120 may be embodied as, or otherwise use any suitable display technology including, for example, a liquid crystal display (LCD), a light emitting diode (LED) display, a cathode ray tube (CRT) display, a plasma display, and/or other display technology. In embodiments in which the display 120 is not a touchscreen display, the mobile computing device 100 may include another component/device to receive user input. Although only one display 120 is shown in the illustrative embodiment of FIG. 1, in other embodiments, the mobile computing device 100 may include multiple displays 120.

The communication circuitry 122 may be embodied as any communication circuit, device, or collection thereof, capable of enabling communications between the mobile computing device 100 and other remote devices over a network. The communication circuitry 122 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 124 may include any number of additional peripheral or interface devices, such as speakers, microphones, additional storage devices, and so forth. The particular devices included in the peripheral devices 124 may depend on, for example, the type and/or intended use of the mobile computing device 100.

Figure 2:
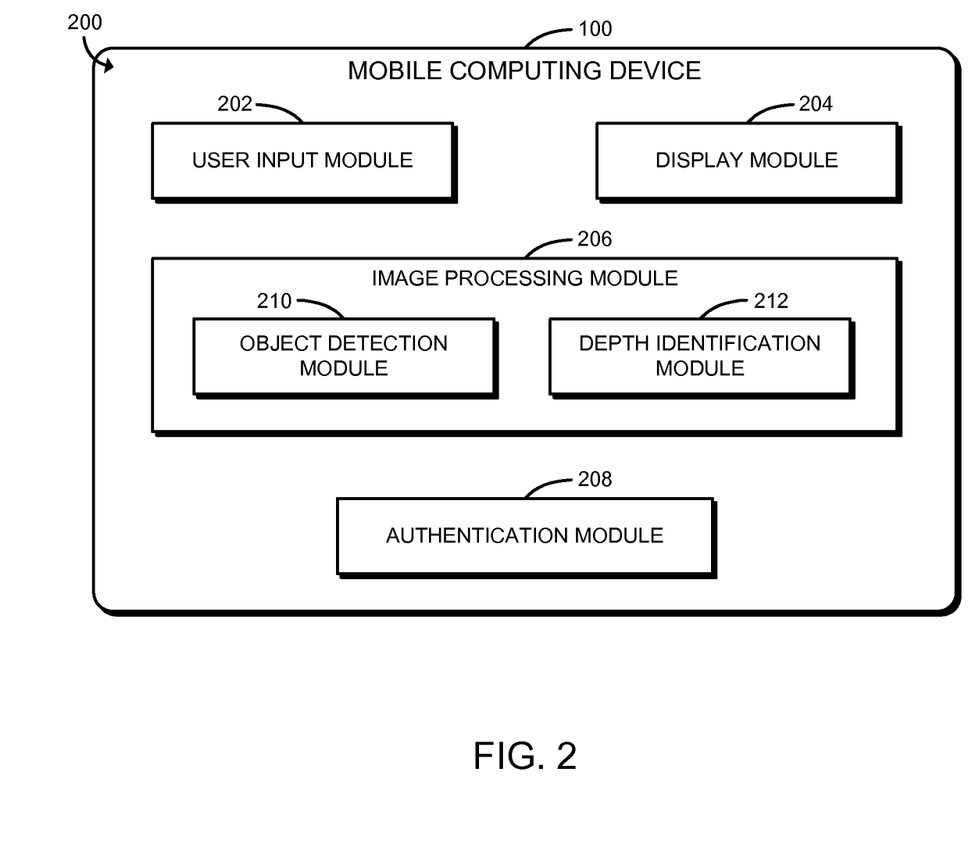
FIG. 2 is a simplified block diagram of at least one embodiment of an environment of the mobile computing device of FIG. 1.

Referring now to FIG. 2, in use, the mobile computing device 100 establishes an environment 200 for depth-based user authentication. The illustrative environment 200 of the mobile computing device 100 includes a user input module 202, a display module 204, an image processing module 206, and an authentication module 208. Additionally, the illustrative image processing module 206 includes an object detection module 210 and a depth identification module 212. The various modules of the environment 200 may be embodied as hardware, software, firmware, or a combination thereof. For example, the various modules, logic, and other components of the environment 200 may form a portion of, or otherwise be established by, the processor 110 or other hardware components of the mobile computing device 100. As such, in some embodiments, one or more of the modules of the environment 200 may be embodied as a circuit or collection of electrical devices (e.g., a user input circuit, a display circuit, an image processing circuit, an authentication circuit, an object detection circuit, and/or a depth identification circuit). Additionally, in some embodiments, one or more of the illustrative modules may form a portion of another module and/or one or more of the illustrative modules may be independent of one another.

The user input module 202 is configured to receive and process user inputs. For example, a user of the mobile computing device 100 may "enter" a depth-based password on the touchscreen display 120 of the mobile computing device 100. As described herein, in some embodiments, the user may select a sequence of objects in a login image at various depths. For example, the user may select a first object in the background of the login image, a second object in the foreground of the login image, a third object in the middle ground of the login image, and a fourth object in the foreground of the login image. In other embodiments, the user may select a sequence of objects in a login image and move each of the selected objects to a different depth. For example, the user may select a first object in the background of the login image and move it to the foreground, a second object in the middle ground of the login image and move it to the background, and so on. The user input module 202 may identify the location on the image selected by the user by the pixel coordinate or any other suitable way. It should be appreciated that the number of objects selected by the user may vary depending on the particular embodiment. Further, in some embodiments, the user input module 202 may permit the user to select a particular image to use as a login image.

The display module 204 renders images on the display 120 for the user of the mobile computing device 100 to view. For example, as described herein, the display module 204 may display a login image on the display 120 with which the user may interact (e.g., via a touchscreen or other user interface device) to enter a particular password. Further, in some embodiments, the display module 204 may display an overlay (e.g., a semi-transparent overlay) over and/or a boundary around one or more objects in the login image indicative of a relative depth of the corresponding object. As such, the display module 204 may clearly identify the depth of objects in the login image for the user.

The image processing module 206 is configured to receive and analyze login images/video. For example, as described below, the image processing module 206 may receive an image selected by the user (e.g., from storage or captured by the camera 118) of the mobile computing device 100 to use as the login image, which the image processing module 206 may analyze to identify the objects in the image, the relative depth of each of those objects, and/or other characteristics of the image.

In particular, the object detection module 210 of the image processing module 206 is configured to identify objects in the scene (e.g., in the foreground, middle ground, or background) of the image and may utilize any suitable object detection algorithm for doing so. In some embodiments, the object detection module 210 may utilize edge detection filters and/or algorithms to identify the boundary of the objects in the color image (e.g., the RGB stream/channel). For example, the object detection module 210 may utilize image gradient operator(s) (e.g., separable Sobel filters), a Canny edge detector, and/or other edge detection algorithms. In another embodiment, the object detection module 210 may additionally, or alternatively, utilize one or more suitable image segmentation algorithms for identifying the objects in the scene (e.g., pyramid segmentation). As described herein, the object detection module 210 may determine the objects of the login image selected by the user. For example, in some embodiments, the object detection module 210 may receive the coordinates (or array indices) of the image location selected by the user from the user input module 202 and identify the corresponding object of the image.

The depth identification module 212 is configured to determine a relative depth of the objects identified in the login image. In doing so, in the illustrative embodiment, the depth identification module 212 utilizes the depth channel of the login image. For example, in some embodiments, the depth identification module 212 may identify a depth value (e.g., depth pixel value) corresponding with one or more of the image pixels within the boundaries of the identified/segmented object. Further, during user authentication, the depth identification module 212 may determine the depth value corresponding with a user-selected image pixel. In the illustrative embodiment, in determining the relative depth of the object, the depth identification module 212 determines the relative depth of the object to be an object in the foreground, the middle ground, or the background. However, it should be appreciated that the depth identification module 212 may utilize a different number of depth classes (e.g., two or more) and/or otherwise label/identify the depth classes in other embodiments (e.g., nearest, near, mid, far, farthest). In some embodiments, the depth identification module 212 may use a plurality of threshold depth values to determine whether a particular object belongs to a particular depth class (e.g., foreground, middle ground, background). For example, "middle ground" may be associated with depth values between two threshold values, and "foreground" and "background" may be associated with depth values above/below the corresponding one of those threshold values.

Of course, the depth identification module 212 may use another suitable technique to determine the relative depth of objects in other embodiments. For example, in some embodiments, the depth identification module 212 may determine the relative depth of objects based on a 2D image (i.e., an image without a depth channel) or a set of 2D images (e.g., two 2D images of the same scene from different perspectives). Although the depth channel is described herein as being used independently of the 2D image channels, it should be appreciated that in some embodiments the mobile computing device 100 may utilize the 2D and depth channels simultaneously to identify the objects and the relative object depths. In some embodiments, the mobile computing device 100 may store the login image, data associated with the objects identified in the login image, data associated with the relative depths (e.g., the depth classes) of the objects identified in the login image, and/or other suitable data for use during authentication (e.g., so that a user-selected pixel can be efficiently mapped to a corresponding depth class). In other embodiments, the mobile computing device 100 may re-identify the objects and the relative depths of the login image during authentication.

As described below, in some embodiments, the depth identification module 212 determines/generates distinguishable depth overlays (e.g., semi-transparent overlays) indicative of a relative depth of each of the objects in the login image. For example, each of the objects in the foreground of the image may have a depth overlay of a first color (e.g., red) placed over those objects, each of the objects in the middle ground of the image may have a depth overlay of a second color (e.g., blue) placed over those objects, and each of the objects in the background of the image may have a depth overlay of a third color (e.g., green) placed over those objects. In such a way, during authentication, the mobile computing device 100 may assist the user in identifying the accurate relative depth of each of the objects in the scene.

The authentication module 208 is configured to generate a device login password based on the relative depth of objects selected by a user of the mobile computing device 100 (e.g., during a password initialization phase). In the illustrative embodiment, each of the relative depths or depth classes may be mapped/encoded to a separate password token (e.g., background="B", middle ground="M", and foreground="F"). As such, the authentication module 208 may construct a password based on the relative depths of the objects selected. For example, in such an embodiment, suppose a user selected a sequence of objects in which an object in the background was selected, then an object in the foreground was selected, then an object in the background was selected, and then an object in the middle ground was selected. In that embodiment, the authentication module 208 may assign the proper tokens and concatenate the tokens corresponding with the relative depth or depth class of the selected objects in the same order in which the selections occurred (i.e., to result in a password of "BFBM"). Of course, the authentication module 208 may store the generated device login password to the memory 114 and/or the data storage 116 (e.g., secure memory) for subsequent user authentication. As described below, if the user subsequently enters the correct depth sequence (e.g., "BFBM" in the embodiment described above), the user will be permitted access to the mobile computing device 100. Otherwise, in the illustrative embodiment, access to the mobile computing device 100 will be denied.

As described below, in another embodiment, the user may select an object in the login image and move the selected object to a different relative depth. In such embodiments, the authentication module 208 may similarly construct a password. For example, suppose the user moves objects in the login image according to the following sequence: a foreground object to the background, a middle ground object to the foreground, a middle ground object to the background, and a background object to the middle ground. In such an embodiment, the authentication module 208 may assign the proper tokens and concatenate the tokens in the same order in which the selections occurred. Further, it should be appreciated that the authentication module 208 may treat the movement of the object in any suitable way. For example, in some embodiments, the authentication module 208 may assign a different token to the movement (e.g., "X") in which case the login password for the embodiment described above would be "FXBMXFMXBBXM." In another embodiment, the authentication module 208 may ignore the movement as part of the password in which case the login password may be "FBMFMBBM." In yet another embodiment, the authentication module 208 may replace movement from one depth to another depth with another token. For example, the authentication module 208 may replace "FXB" or "FB" in the embodiments described above with a separate token "Z" and replace "MXF" or "MF" with a separate token "Y." It should be appreciated that the authentication module 208 may utilize any token encoding suitable for performing the functions described herein.

Figure 3:
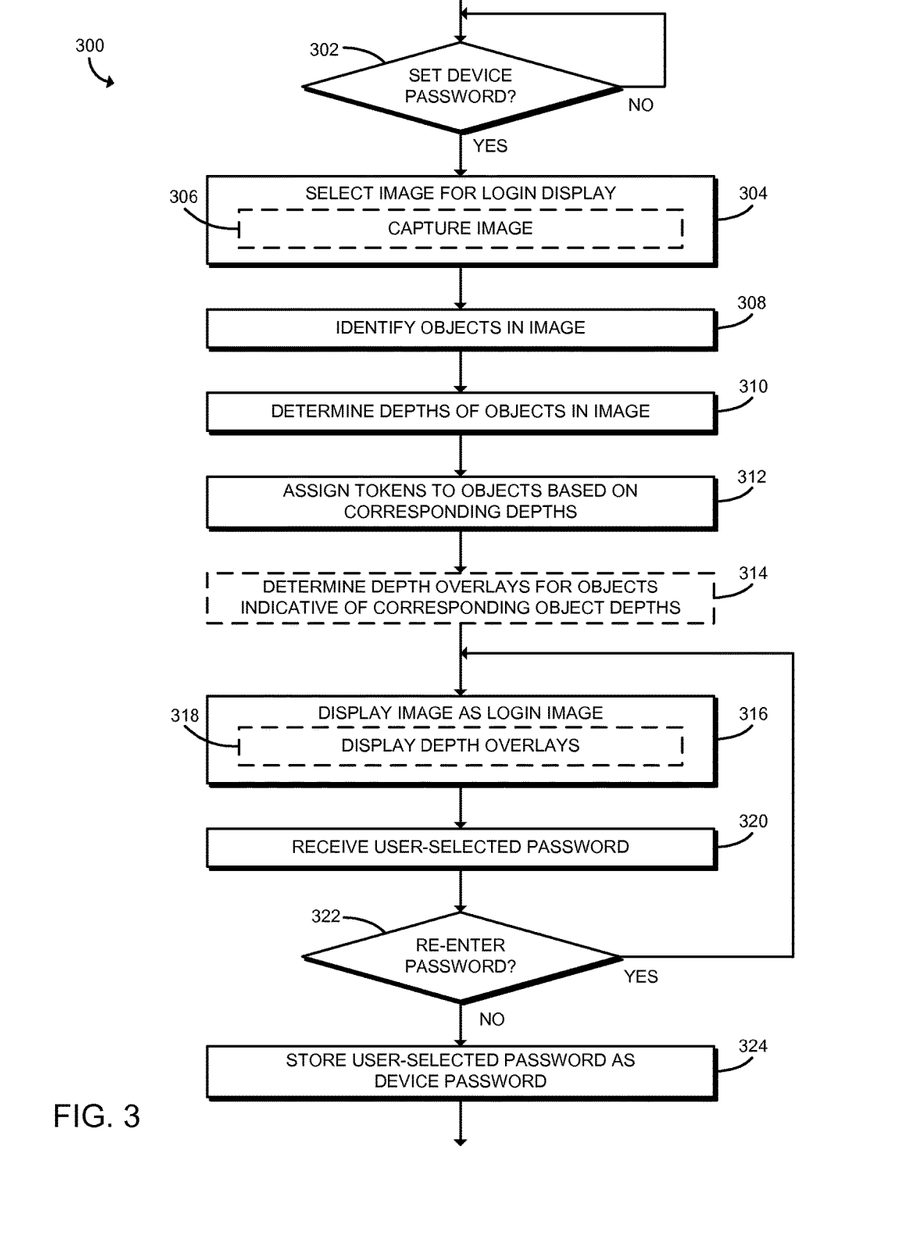
FIG. 3 is a simplified block diagram of at least one embodiment of a method for setting a device password for depth-based user authentication.
Figure 6:
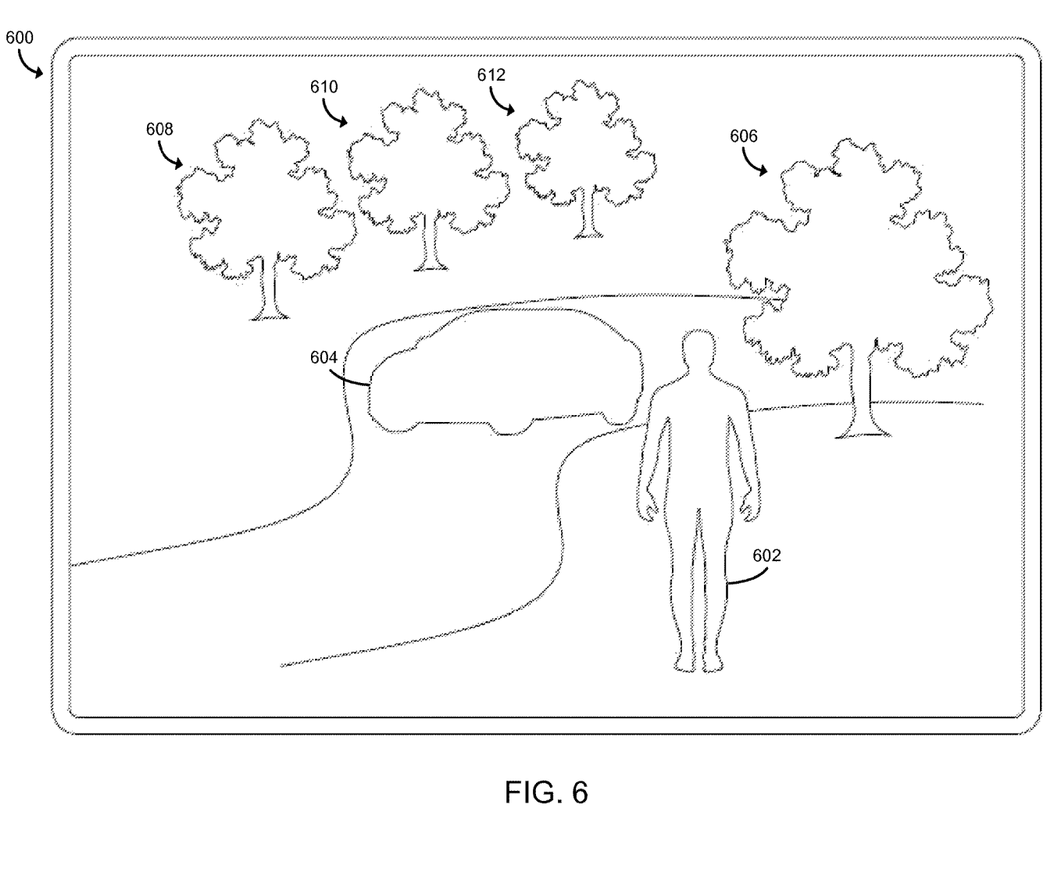
FIGS. 6-8 are simplified diagrams illustrating a user's interaction with a login image.

Referring now to FIG. 3, in use, the mobile computing device 100 may execute a method 300 for setting a device password for depth-based user authentication. The illustrative method 300 begins with block 302 in which the mobile computing device 100 determines whether to set the device login password. If so, the mobile computing device 100 selects an image to display as a login image in block 304. For example, the mobile computing device 100 may select a login image similar to a login image 600 shown in FIG. 6. As shown, the illustrative login image 600 shows a person 602 at a first depth (e.g., near), a car 604 and a tree 606 at a second depth (e.g., middle), and three trees 608, 610, 612 at a third depth (e.g., far). In some embodiments, in block 306, the mobile computing device 100 may select the image to display as the login image by capturing an image with the camera 118. In other embodiments, the login image may be selected from one or more images stored on or otherwise accessible to the mobile computing device 100. For example, depending on the particular embodiment, the mobile computing device 100 may prompt the user to select a particular image (e.g., a 3D image), randomly select one of the available images, select a default or preselected image, and/or otherwise select a login image. It should be appreciated that, in some embodiments, the login image used to set the device password may be different from a login image used to subsequently login to the mobile computing device 100. Further, in the illustrative embodiment, because the password is depth-based, the password may be generated independent of the particular login image. As such, in some embodiments, the mobile computing device 100 may periodically change the image used for user authentication. Additionally, in some embodiments, the mobile computing device 100 may utilize a login video (or video frame) consistent with the techniques described herein.

In block 308, the mobile computing device 100 identifies the objects in the selected login image. As described above, the mobile computing device 100 may utilize edge detection filters/algorithms, image segmentation algorithms, and/or another suitable technique to identify the objects in the login image. In block 310, the mobile computing device 100 determines the relative depths of the objects in the login image. For example, in some embodiments, the mobile computing device 100 may identify each of the objects that are in the foreground of the image, each of the objects that are in the background of the image, and each of the objects that are in the middle ground of the image (e.g., based on the corresponding depth values of the pixels corresponding with the objects) as described above.

In block 312, the mobile computing device 100 may assign password tokens to the objects based on the corresponding relative depths of the objects in the login image. For example, as described above, each of the relative depths or depth classes may be mapped or encoded to a separate password token (e.g., background="B", middle ground="M", and foreground="F"). It should be appreciated that the mobile computing device 100 may utilize any mapping or encoding of the tokens suitable for performing the functions described herein. Further, the number of distinct tokens may vary depending on the number of depth classes utilized in a particular embodiment. In block 314, the mobile computing device 100 may determine depth overlays for the objects in the login image that are indicative of a relative depth of the corresponding object. For example, in some embodiments, the mobile computing device 100 may assign a distinct semi-transparent color to each of the depth classes as described above (e.g., so that the user may easily distinguish object depths). Further, the mobile computing device 100 may, additionally or alternatively, determine/generate a distinct border (e.g., a colored border) for each of the depth classes.

Figure 7:
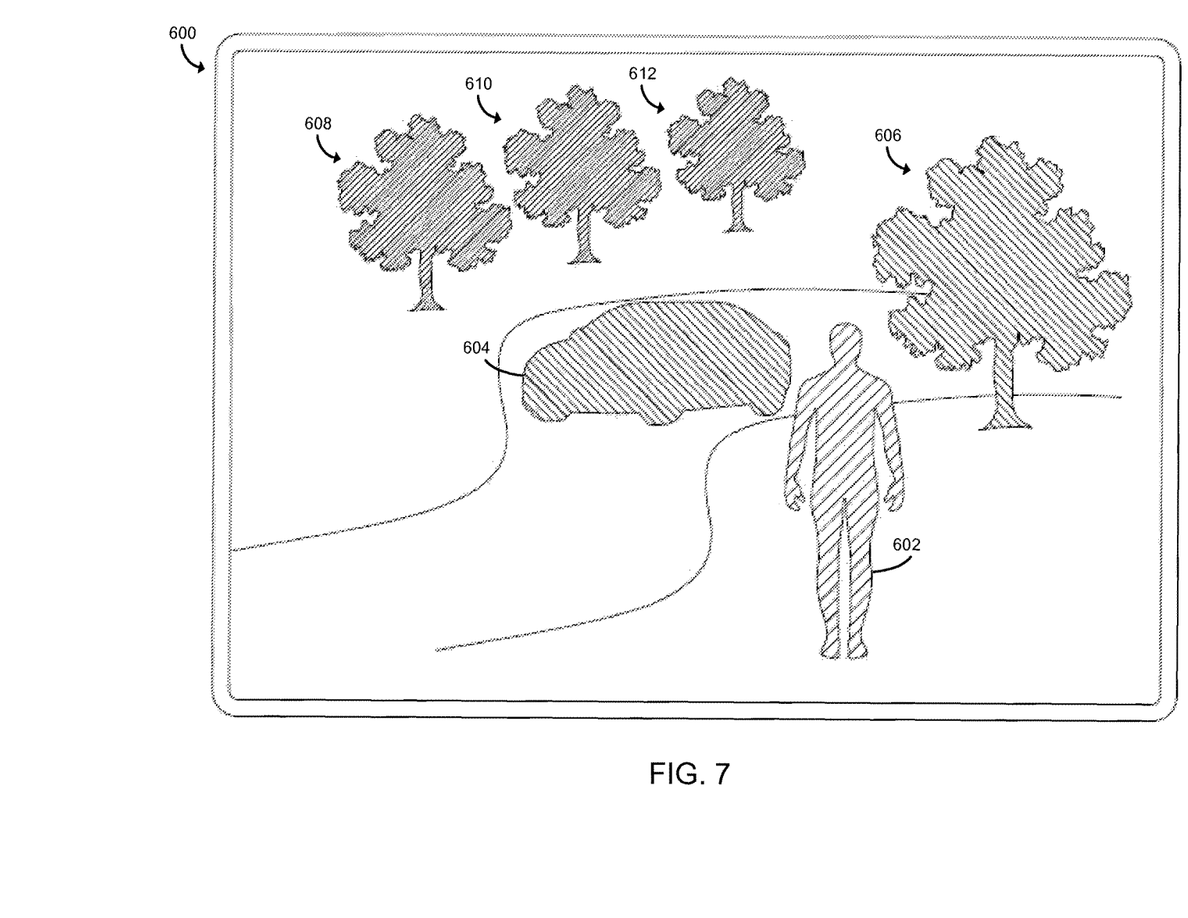

In block 316, the mobile computing device 100 displays the selected image as the login image on the display 120 for a user of the mobile computing device 100 to view. In doing so, in some embodiments, the mobile computing device 100 may display the determined depth overlays in block 318. In particular, for each of the depth classes, the mobile computing device 100 may display a distinct semi-transparent color overlay and/or a distinct border (e.g., a colored border) over/around the corresponding objects in the login image. For example, as shown in the modified login image 600 of FIG. 7, the mobile computing device 100 may display a first distinct overlay over and/or border around the person 602 to indicate that the person 602 is at a first depth (e.g., near), a second distinct overlay over and/or border around the car 604 and the tree 606 to indicate that the car 604 and the tree 606 are at a second depth (e.g., middle), and a third distinct overlay over and/or border around the trees 608, 610, 612 to indicate that the trees 608, 610, 612 are at a third depth (e.g., far). It should be appreciated that the depth overlays may improve the user's ability to determine the relative depth of each of the objects in the login image. In block 320, the mobile computing device 100 receives a user-selected password. That is, the mobile computing device 100 generates a depth-based device password based on depth-based object selections received from a user of the mobile computing device 100 (e.g., via a touchscreen display).

Figure 4:
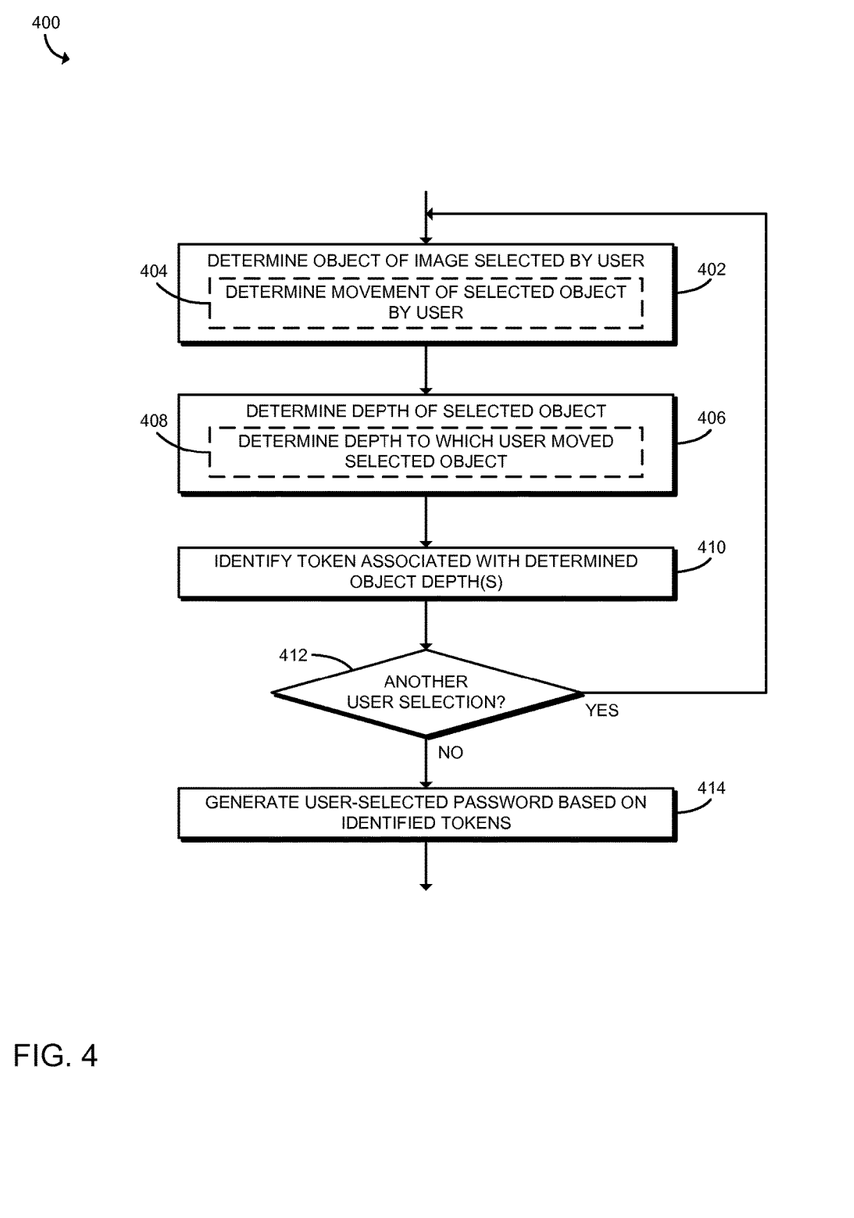
FIG. 4 is a simplified block diagram of at least one embodiment of a method for generating a depth-based password.
Figure 8:
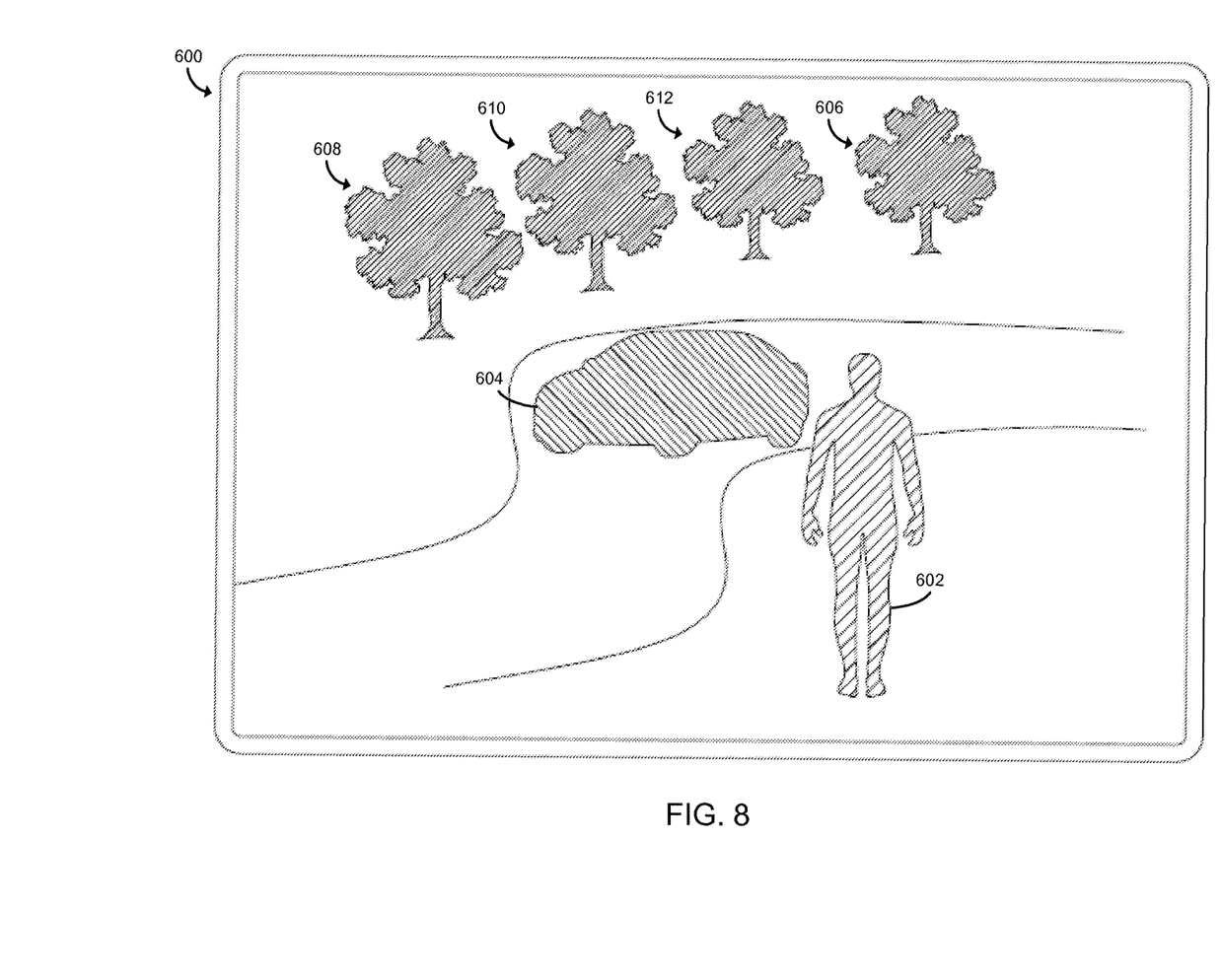

To do so, the mobile computing device 100 may execute a method 400 as shown in FIG. 4. The illustrative method 400 begins with block 402 in which the mobile computing device 100 determines an object of the login image selected by the user of the mobile computing device 100. As described above, in doing so, the mobile computing device 100 may correlate the location of the login image selected by the user with the corresponding object. Further, in some embodiments, the device password may involve moving a selected object of the login image to a different relative depth within the image. In such embodiments, the mobile computing device 100 may determine the movement of the selected object by the user in block 404. It should be appreciated that, in some embodiments, the mobile computing device 100 may modify the size and/or depth overlay of an object that is moved to a different relative depth within the login image. For example, as shown in the in the modified login image of FIG. 8, the mobile computing device 100 may determine that the user has selected the tree 606 and moved the tree 606 to the background. As such, the mobile computing device 100 may reduce the size of the tree 606 and/or change the overlay over/around the tree 606 to reflect the new depth (e.g., to the third distinct overlay described above) for the user's benefit as shown in the modified login image 600. In block 406, the mobile computing device 100 determines the relative depth (e.g., the depth class) of the selected object. As described above, in some embodiments, the mobile computing device 100 may determine the relative depth to a predefined depth selected from a set of predefined depth classes (e.g., background, middle ground, and foreground). Further, in block 408, the mobile computing device 100 may determine the relative depth to which the user moved the selected object in embodiments in which the device password involves moving the selected objects. In block 410, the mobile computing device 100 identifies the token(s) associated with the determined object depth(s) as described above.

In block 412, the mobile computing device 100 determines whether to receive another user selection. It should be appreciated that the manner by which the mobile computing device 100 makes such a determination may vary depending on the particular embodiment. For example, in some embodiments, the user may enter an arbitrary-length password in which the mobile computing device 100 may wait until a predefined period of delay has elapsed since the last selection or the user otherwise indicates that the password is fully entered (e.g., via a separate button). In other embodiments, the mobile computing device 100 may expect a password of a predefined length in which case the mobile computing device 100 may determine whether the predefined number of selections have been received. If the mobile computing device 100 determines to receive another user selection, the method 400 returns to block 402. Otherwise, the mobile computing device 100 generates the user-selected password based on the identified tokens in block 414. For example, in some embodiments, the mobile computing device 100 may concatenate the tokens in the same order in which they were selected as described above. Of course, the mobile computing device 100 may generate the user-selected password based on the identified tokens according to another suitable scheme in other embodiments.

Returning to FIG. 3, in block 322, the mobile computing device 100 determines whether the user is to re-enter the password. For example, in some embodiments, the mobile computing device 100 may request the user to re-enter the password at least one time to ensure that the user has selected the password that she intended. If the password is to be re-entered, the method 300 returns to block 318 in which the mobile computing device 100 again displays the login image for user interaction. If not, the mobile computing device 100 stores the user-selected password as the device password to the memory 114 and/or the data storage 116 (e.g., secure memory) in block 324.

Figure 5:
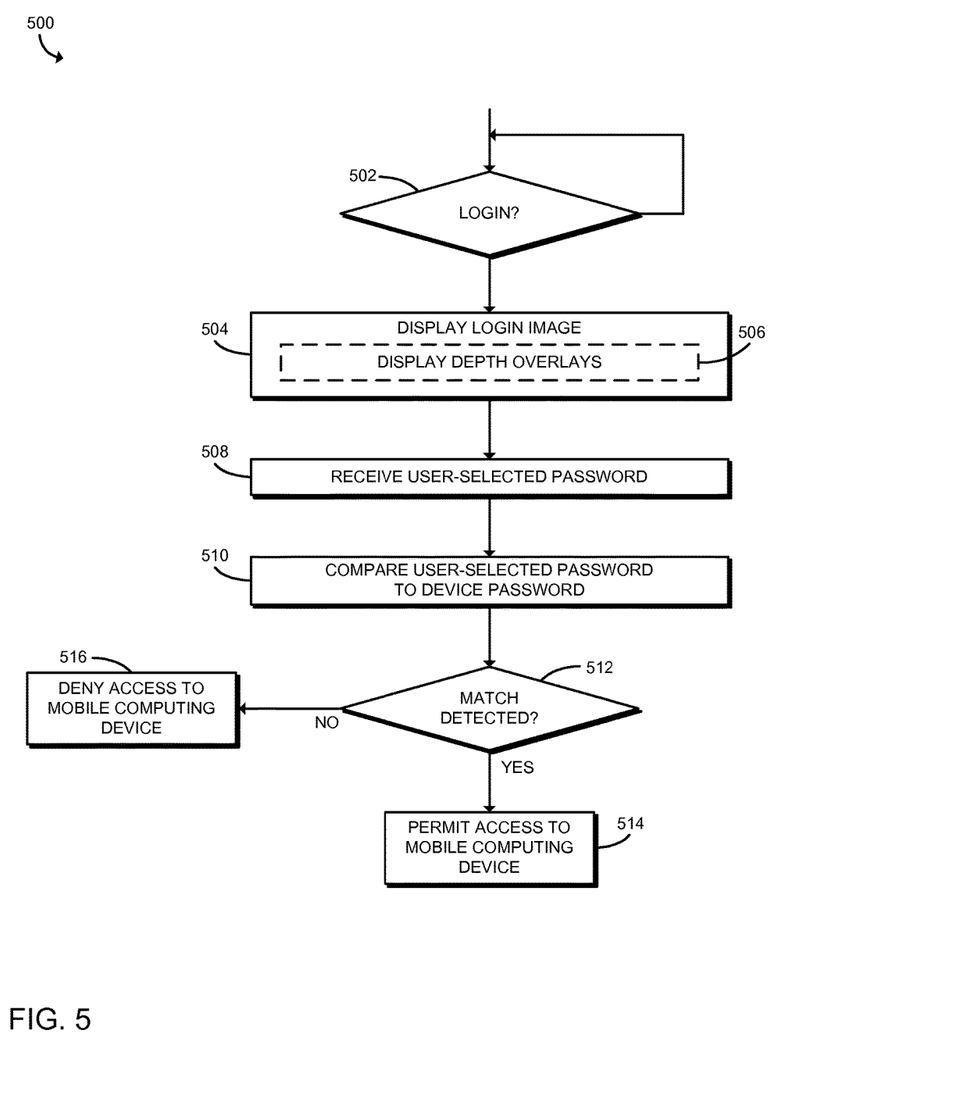
FIG. 5 is a simplified block diagram of at least one embodiment of a method for depth-based user authentication.

Referring now to FIG. 5, in use, the mobile computing device 100 may execute a method 500 for depth-based user authentication. The illustrative method 500 begins with block 502 in which the mobile computing device 100 determines whether to permit a user of the mobile computing device 100 to attempt to login to the mobile computing device 100. If so, the mobile computing device 100 displays a login image in block 504. For example, in some embodiments, upon boot of the mobile computing device 100 and/or upon being awaken from a low-power sleep state, the mobile computing device 100 may display the login image requesting user authentication. As described above, it should be appreciated that the login image displayed in block 504 may be different from the login image displayed when the user set the device password. Further, in some embodiments, the mobile computing device 100 may change the login image each time the user attempts to login, periodically, or in response to another suitable condition. In some embodiments, in block 506, the mobile computing device 100 may display depth overlays over the objects in the login image in order to clearly convey to the user the corresponding relative depth of each of those objects (e.g., to simplify password entry).

In block 508, the mobile computing device 100 receives a user-selected password. That is, the mobile computing device 100 generates a depth-based password based on depth-based object selections received from a user of the mobile computing device 100 (e.g., via a touchscreen display). In some embodiments, to do so, the mobile computing device 100 may execute the method 400 as shown in FIG. 4 and described above. In block 510, the mobile computing device 100 retrieves the device login password and compares the user-selected password to the device login password (i.e., to determine whether the user entered the same depth pattern). If the mobile computing device 100 determines, in block 512, that the user-selected password matches the device password, the mobile computing devices 100 permits the user to access the mobile computing device 100 in block 514. However, if the mobile computing device 100 determines that the user-selected password does not match the device login password, the mobile computing device 100 denies the user access to the mobile computing device 100 in block 516. Additionally, in some embodiments, the mobile computing device 100 may employ one or more error handling or security procedures. For example, if the user enters the wrong password multiple times, the mobile computing device 100 may shut off, "lock up," delete one or more files, transmit a security message (e.g., to the device owner, security administrator, and/or OEM, etc.), and/or perform another suitable function. It should be appreciated that the techniques described herein address various vulnerabilities of pattern-based authentication while simultaneously maintaining desirable features (e.g., efficiency, simplicity, etc.).

EXAMPLES

Illustrative examples of the technologies disclosed herein are provided below. An embodiment of the technologies may include any one or more, and any combination of, the examples described below.

Example 1 includes a mobile computing device for depth-based user authentication, the mobile computing device comprising a display; a display module to display a login image on the display, wherein the login image includes a depth channel; an image processing module to determine a selection of a plurality of objects of the login image made by a user of the mobile computing device, and; and an authentication module to (i) generate a user-selected password based on a relative depth of each object of the plurality of objects selected by the user and (ii) permit access to the mobile computing device in response to a determination that the user-selected password matches a device login password.

Example 2 includes the subject matter of Example 1, and wherein the display module is to display a semi-transparent overlay over each object in the login image; and wherein each overlay is indicative of a relative depth of the corresponding object.

Example 3 includes the subject matter of any of Examples 1 and 2, and wherein the image processing module is to determine a relative depth of each object of the plurality of objects selected by the user; wherein to generate the user-selected password comprises to identify a token associated with the relative depth of each object; and wherein the user-selected password comprises a sequence of tokens.

Example 4 includes the subject matter of any of Examples 1-3, and wherein to generate the user-selected password comprises to concatenate the tokens in an order in which the user selected the corresponding objects.

Example 5 includes the subject matter of any of Examples 1-4, and wherein the selection comprises a selection of the plurality of objects in a specific sequential order.

Example 6 includes the subject matter of any of Examples 1-5, and wherein to determine the selection comprises to determine a relative depth to which each object of the plurality of objects was moved by the user.

Example 7 includes the subject matter of any of Examples 1-6, and wherein to generate the user-selected password comprises to generate the user-selected password based on the relative depth of each object of the plurality of objects and the relative depth to which each object of the plurality of objects was moved.

Example 8 includes the subject matter of any of Examples 1-7, and wherein to display the login image comprises to display a video including the login image.

Example 9 includes the subject matter of any of Examples 1-8, and wherein the image processing module is further to determine the relative depth of each object of the plurality of objects to be a depth corresponding with one of a foreground, a middle ground, or a background of the login image.

Example 10 includes the subject matter of any of Examples 1-9, and wherein the authentication module is further to deny access to the mobile computing device in response to a determination that the user-selected password does not match the device login password.

Example 11 includes a method for depth-based user authentication, the method comprising displaying, by a mobile computing device, a login image on a display of the mobile computing device, wherein the login image includes a depth channel; determining, by the mobile computing device, a selection of a plurality of objects of the login image made by a user of the mobile computing device; generating, by the mobile computing device, a user-selected password based on a relative depth of each object of the plurality of objects selected by the user; and permitting, by the mobile computing device, access to the mobile computing device in response to determining the user-selected password matches a device login password.

Example 12 includes the subject matter of Example 11, and wherein displaying the login image comprises displaying a semi-transparent overlay over each object in the login image; and wherein each overlay is indicative of a relative depth of the corresponding object.

Example 13 includes the subject matter of any of Examples 11 and 12, and wherein generating the user-selected password comprises determining a relative depth of each object of the plurality of objects selected by the user; and identifying a token associated with the relative depth of each object, wherein the user-selected password comprises a sequence of tokens.

Example 14 includes the subject matter of any of Examples 11-13, and wherein generating the user-selected password comprises concatenating the tokens in an order in which the user selected the corresponding objects.

Example 15 includes the subject matter of any of Examples 11-14, and wherein determining the selection comprises determining a selection of the plurality of objects in a specific sequential order.

Example 16 includes the subject matter of any of Examples 11-15, and wherein determining the selection comprises determining a relative depth to which each object of the plurality of objects was moved by the user.

Example 17 includes the subject matter of any of Examples 11-16, and wherein generating the user-selected password comprises generating the user-selected password based on the relative depth of each object of the plurality of objects and the relative depth to which each object of the plurality of objects was moved.

Example 18 includes the subject matter of any of Examples 11-17, and wherein displaying the login image comprises displaying a video including the login image.

Example 19 includes the subject matter of any of Examples 11-18, and further comprising determining, by the mobile computing device, the relative depth of each object of the plurality of objects to be a depth corresponding with one of a foreground, a middle ground, or a background of the login image.

Example 20 includes the subject matter of any of Examples 11-19, and further including denying, by the mobile computing device, access to the mobile computing device in response to determining the user-selected password does not match the device login password.

Example 21 includes a computing device comprising a processor; and a memory having stored therein a plurality of instructions that when executed by the processor cause the computing device to perform the method of any of Examples 11-20.

Example 22 includes one or more machine-readable storage media comprising a plurality of instructions stored thereon that in response to being executed result in a computing device performing the method of any of Examples 11-20.

Example 23 includes a computing device comprising means for performing the method of any of Examples 11-20.

Example 24 includes a mobile computing device for depth-based user authentication, the mobile computing device comprising means for displaying a login image on a display of the mobile computing device, wherein the login image includes a depth channel; means for determining a selection of a plurality of objects of the login image made by a user of the mobile computing device; means for generating a user-selected password based on a relative depth of each object of the plurality of objects selected by the user; and means for permitting access to the mobile computing device in response to determining the user-selected password matches a device login password.

Example 25 includes the subject matter of Example 24, and wherein the means for displaying the login image comprises means for displaying a semi-transparent overlay over each object in the login image; and wherein each overlay is indicative of a relative depth of the corresponding object.

Example 26 includes the subject matter of any of Examples 24 and 25, and wherein the means for generating the user-selected password comprises means for determining a relative depth of each object of the plurality of objects selected by the user; and means for identifying a token associated with the relative depth of each object, wherein the user-selected password comprises a sequence of tokens.

Example 27 includes the subject matter of any of Examples 24-26, and wherein the means for generating the user-selected password comprises means for concatenating the tokens in an order in which the user selected the corresponding objects.

Example 28 includes the subject matter of any of Examples 24-27, and wherein the means for determining the selection comprises means for determining a selection of the plurality of objects in a specific sequential order.

Example 29 includes the subject matter of any of Examples 24-28, and wherein the means for determining the selection comprises means for determining a relative depth to which each object of the plurality of objects was moved by the user.

Example 30 includes the subject matter of any of Examples 24-29, and wherein the means for generating the user-selected password comprises means for generating the user-selected password based on the relative depth of each object of the plurality of objects and the relative depth to which each object of the plurality of objects was moved.

Example 31 includes the subject matter of any of Examples 24-30, and wherein the means for displaying the login image comprises means for displaying a video including the login image.

Example 32 includes the subject matter of any of Examples 24-31, and further including means for determining the relative depth of each object of the plurality of objects to be a depth corresponding with one of a foreground, a middle ground, or a background of the login image.

Example 33 includes the subject matter of any of Examples 24-32, and further including means for denying access to the mobile computing device in response to determining the user-selected password does not match the device login password.

Example 34 includes a mobile computing device for setting a device password for depth-based user authentication, the mobile computing device comprising a display; an image processing module to (i) receive an image to display to a user of the mobile computing device for depth-based authentication, (ii) identify a first plurality of objects of the image, and (iii) determine a relative depth of each object of the first plurality of objects, wherein the image includes a depth channel; an authentication module to assign a token to each object of the first plurality of objects based on the relative depth of the corresponding object; a display module to display the image on the display; and a user input module to determine a user selection of a second plurality of objects of the displayed image, wherein the authentication module is further to generate a device login password based on a relative depth of each object of the second plurality of objects selected by the user.

Example 35 includes the subject matter of Example 34, and further including a camera, wherein to receive the image comprises to capture an image with the camera.

Example 36 includes the subject matter of any of Examples 34 and 35, and wherein to determine the relative depth of each object comprises to determine the relative depth of each object of the first plurality of objects to be a depth that corresponds with one of a foreground, a middle ground, or a background of the image.

Example 37 includes the subject matter of any of Examples 34-36, and wherein to display the image comprises to display a semi-transparent overlay over each object in the image; and wherein each overlay is indicative of a relative depth of the corresponding object.

Example 38 includes the subject matter of any of Examples 34-37, and wherein the authentication module is further to store the device login password to a memory of the mobile computing device, wherein user entry of the device login password is subsequently required to access to the mobile computing device.

Example 39 includes the subject matter of any of Examples 34-38, and wherein the image processing module is further to determine determining a relative depth of each object of the second plurality of objects selected by the user; wherein to generate the device login password comprises to identify a token associated with the relative depth of each object; and wherein the device login password comprises a sequence of tokens.

Example 40 includes the subject matter of any of Examples 34-39, and wherein to generate the device login password comprises to concatenate the tokens in an order in which the user selected the corresponding objects.

Example 41 includes the subject matter of any of Examples 34-40, and wherein to determine the user selection comprises to determine a relative depth to which each object of the second plurality of objects was moved by the user.

Example 42 includes the subject matter of any of Examples 34-41, and wherein to generate the device login password comprises to generate the device login password based on the relative depth of each object of the second plurality of objects and the relative depth to which each object of the second plurality of objects was moved.

Example 43 includes the subject matter of any of Examples 34-42, and wherein to display the image comprises to display an image frame of a video.

Example 44 includes the subject matter of any of Examples 34-43, and wherein to receive the image comprises to receive a user selection of an image for display.

Example 45 includes a method for setting a device password for depth-based user authentication, the method comprising selecting, by a mobile computing device, an image to display to a user of the mobile computing device for depth-based authentication, wherein the image includes a depth channel; identifying, by the mobile computing device, a first plurality of objects of the image; determining, by the mobile computing device, a relative depth of each object of the first plurality of objects; assigning, by the mobile computing device, a token to each object of the first plurality of objects based on the relative depth of the corresponding object; displaying, by the mobile computing device, the image on a display of the mobile computing device; determining, by the mobile computing device, a user selection of a second plurality of objects of the displayed image; generating, by the mobile computing device, a device login password based on a relative depth of each object of the second plurality of objects selected by the user.

Example 46 includes the subject matter of Example 45, and wherein selecting the image comprises capturing an image with a camera of the mobile computing device.

Example 47 includes the subject matter of any of Examples 45 and 46, and wherein determining the relative depth of each object comprises determining the relative depth of each object of the first plurality of objects to be a depth corresponding with one of a foreground, a middle ground, or a background of the image.

Example 48 includes the subject matter of any of Examples 45-47, and wherein displaying the image comprises displaying a semi-transparent overlay over each object in the image; and wherein each overlay is indicative of a relative depth of the corresponding object.

Example 49 includes the subject matter of any of Examples 45-48, and further including storing, by the mobile computing device, the device login password to a memory of the mobile computing device, wherein user entry of the device login password is subsequently required to access to the mobile computing device.

Example 50 includes the subject matter of any of Examples 45-49, and wherein generating the device login password comprises determining a relative depth of each object of the second plurality of objects selected by the user; and identifying a token associated with the relative depth of each object, wherein the device login password comprises a sequence of tokens.

Example 51 includes the subject matter of any of Examples 45-50, and wherein generating the device login password comprises concatenating the tokens in an order in which the user selected the corresponding objects.

Example 52 includes the subject matter of any of Examples 45-51, and wherein determining the user selection comprises determining a relative depth to which each object of the second plurality of objects was moved by the user.

Example 53 includes the subject matter of any of Examples 45-52, and wherein generating the device login password comprises generating the device login password based on the relative depth of each object of the second plurality of objects and the relative depth to which each object of the second plurality of objects was moved.

Example 54 includes the subject matter of any of Examples 45-53, and wherein displaying the image comprises displaying an image frame of a video.

Example 55 includes the subject matter of any of Examples 45-54, and wherein selecting the image comprises receiving a user selection of an image for display.

Example 56 includes a computing device comprising a processor; and a memory having stored therein a plurality of instructions that when executed by the processor cause the computing device to perform the method of any of Examples 45-55.

Example 57 includes one or more machine-readable storage media comprising a plurality of instructions stored thereon that in response to being executed result in a computing device performing the method of any of Examples 45-55.

Example 58 includes a computing device comprising means for performing the method of any of Examples 45-55.

Example 59 includes a mobile computing device for setting a device password for depth-based user authentication, the mobile computing device comprising means for selecting an image to display to a user of the mobile computing device for depth-based authentication, wherein the image includes a depth channel; means for identifying a first plurality of objects of the image; means for determining a relative depth of each object of the first plurality of objects; means for assigning a token to each object of the first plurality of objects based on the relative depth of the corresponding object; means for displaying the image on a display of the mobile computing device; means for determining a user selection of a second plurality of objects of the displayed image; means for generating a device login password based on a relative depth of each object of the second plurality of objects selected by the user.

Example 60 includes the subject matter of Example 59, and wherein the means for selecting the image comprises means for capturing an image with a camera of the mobile computing device.

Example 61 includes the subject matter of any of Examples 59 and 60, and wherein the means for determining the relative depth of each object comprises means for determining the relative depth of each object of the first plurality of objects to be a depth corresponding with one of a foreground, a middle ground, or a background of the image.

Example 62 includes the subject matter of any of Examples 59-61, and wherein the means for displaying the image comprises means for displaying a semi-transparent overlay over each object in the image; and wherein each overlay is indicative of a relative depth of the corresponding object.

Example 63 includes the subject matter of any of Examples 59-62, and further including means for storing the device login password to a memory of the mobile computing device, wherein user entry of the device login password is subsequently required to access to the mobile computing device.

Example 64 includes the subject matter of any of Examples 59-63, and wherein the means for generating the device login password comprises means for determining a relative depth of each object of the second plurality of objects selected by the user; and means for identifying a token associated with the relative depth of each object, wherein the device login password comprises a sequence of tokens.

Example 65 includes the subject matter of any of Examples 59-64, and wherein the means for generating the device login password comprises means for concatenating the tokens in an order in which the user selected the corresponding objects.

Example 66 includes the subject matter of any of Examples 59-65, and wherein the means for determining the user selection comprises means for determining a relative depth to which each object of the second plurality of objects was moved by the user.

Example 67 includes the subject matter of any of Examples 59-66, and wherein the means for generating the device login password comprises means for generating the device login password based on the relative depth of each object of the second plurality of objects and the relative depth to which each object of the second plurality of objects was moved.

Example 68 includes the subject matter of any of Examples 59-67, and wherein the means for displaying the image comprises means for displaying an image frame of a video.

Example 69 includes the subject matter of any of Examples 59-68, and wherein the means for selecting the image comprises means for receiving a user selection of an image for display.

The invention claimed is:

1. A mobile computing device for depth-based user authentication, the mobile computing device comprising:
   a display;
   a display module to display a login image on the display, wherein the login image includes a depth channel;
   an image processing module to (i) determine a selection of a plurality of objects of the login image made by a user of the mobile computing, wherein each selected object has a depth associated therewith relative to other selected objects and (ii) determine a depth class for each selected object based on the depth of the corresponding selected object; and
   an authentication module to (i) determine a password token for each selected object based on the depth class of the corresponding selected object, (ii) generate a user-selected password based on the determined password tokens, wherein the password tokens are sequentially arranged in the user-selected password in an order corresponding to the order in which the object corresponding to the password token was selected by the user, and (iii) permit access to the mobile computing device in response to a determination that the user-selected password matches a device login password.

2. The mobile computing device of claim 1, wherein the display module is to display a semi-transparent overlay over each object in the login image; and
   wherein each overlay is indicative of a relative depth of the corresponding object.

3. The mobile computing device of claim 1, wherein to generate the user-selected password comprises to concatenate the password tokens in an order in which the user selected the corresponding objects.

4. The mobile computing device of claim 1, wherein to determine the depth class comprises to determine a depth class for each selected objected based on a relative depth to which each object of the plurality of objects was moved by the user.

5. The mobile computing device of claim 4, wherein to determine a password token for each selected object comprises to determine a password token for each selected object based on the relative depth of each object of the plurality of objects and the relative depth to which each object of the plurality of objects was moved.

6. The mobile computing device of claim 1, wherein to display the login image comprises to display a video including the login image.

7. The mobile computing device of claim 1, wherein to determine the depth class of each object of the plurality of objects to be a depth class corresponding with one of a foreground, a middle ground, or a background of the login image.

8. One or more non-transitory machine-readable storage media comprising a plurality of instructions stored thereon that, in response to execution by a computing device, cause the computing device to:
   display a login image on a display of the computing device, wherein the login image includes a depth channel;
   determine a selection of a plurality of objects of the login image made by a user of the computing device, wherein each selected object has a depth associated therewith relative to other selected objects;
   determine a depth class for each selected object based on the depth of the corresponding selected object;
   determine a password token for each selected object based on the depth class of the corresponding selected object;
   generate a user-selected password based on the determined password tokens, wherein the password tokens are sequentially arranged in the user-selected password in an order corresponding to the order in which the object corresponding to the password token was selected by the user; and
   permit access to the computing device in response to a determination that the user-selected password matches a device login password.

9. The one or more non-transitory machine-readable storage media of claim 8, wherein to display the login image comprises to display a semi-transparent overlay over each object in the login image; and
   wherein each overlay is indicative of a relative depth of the corresponding object.

10. The one or more non-transitory machine-readable storage media of claim 8, wherein to generate the user-selected password comprises to concatenate the password tokens in an order in which the user selected the corresponding objects.

11. The one or more non-transitory machine-readable storage media of claim 8, wherein to determine the depth class selection comprises to determine a depth class for each selected object based on a relative depth to which each object of the plurality of objects was moved by the user; and
   wherein to determine a password token for each selected object comprises to determine a password token for each selected object based on the relative depth of each object of the plurality of objects and the relative depth to which each object of the plurality of objects was moved.

12. The one or more non-transitory machine-readable storage media of claim 8, wherein the plurality of instructions further cause the computing device to deny access to the mobile computing device in response to a determination that the user-selected password does not match the device login password.

13. A method for depth-based user authentication, the method comprising:
   displaying, by a mobile computing device, a login image on a display of the mobile computing device, wherein the login image includes a depth channel;
   determining, by the mobile computing device, a selection of a plurality of objects of the login image made by a user of the mobile computing device, wherein each selected object has a depth associated therewith relative to other selected objects;

determining, by the mobile computing device, a depth class for each selected object based on the depth of the corresponding selected object;

determining, by the mobile computing device, a password token for each selected object based on the depth class of the corresponding selected object;

generating, by the mobile computing device, a user-selected password based on the determined password tokens, wherein the password tokens are sequentially arranged in the user-selected password in an order corresponding to the order in which the object corresponding to the password token was selected by the user; and permitting, by the mobile computing device, access to the mobile computing device in response to determining the user-selected password matches a device login password.

14. The method of claim 13, wherein displaying the login image comprises displaying a semi-transparent overlay over each object in the login image; and wherein each overlay is indicative of a relative depth of the corresponding object.

15. The method of claim 13, wherein generating the user-selected password comprises concatenating the password tokens in an order in which the user selected the corresponding objects.

16. The method of claim 13, wherein determining the depth class comprises determining a depth class for each selected object based on a relative depth to which each object of the plurality of objects was moved by the user.

17. The method of claim 16, wherein determining a password token for each selected object comprises determining a password token for each selected object based on the relative depth of each object of the plurality of objects and the relative depth to which each object of the plurality of objects was moved.

18. The method of claim 13, wherein further comprising denying access to the mobile computing device in response to a determination that the user-selected password does not match the device login password.

* * * * *